H. E. WARREN.
METHOD OF AND APPARATUS FOR GENERATING HOLES IN METAL.
APPLICATION FILED AUG. 24, 1914.
1,123,045.
Patented Dec. 29, 1914.
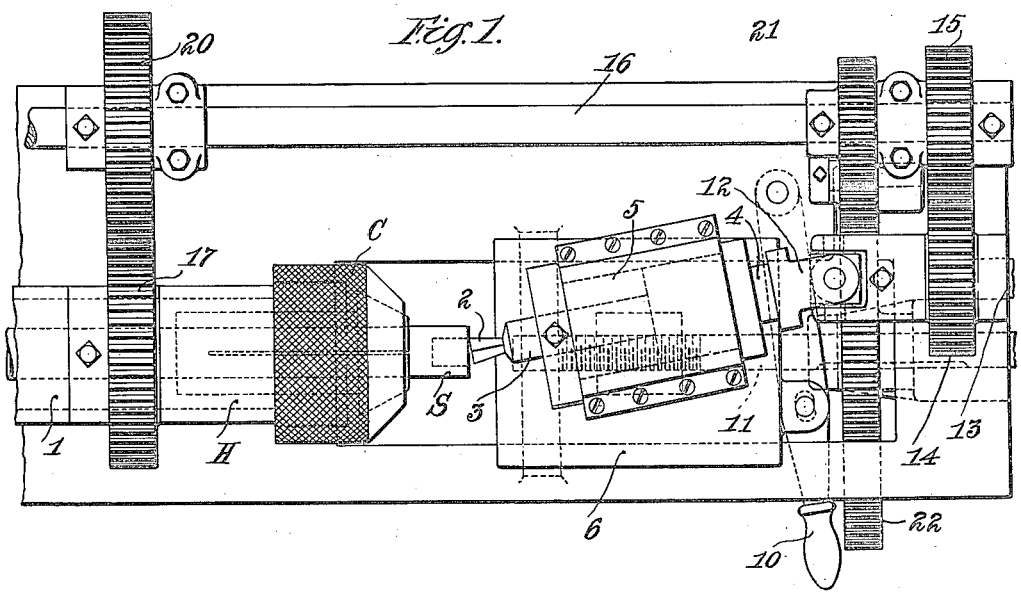
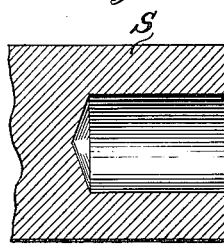
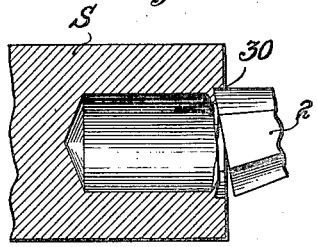
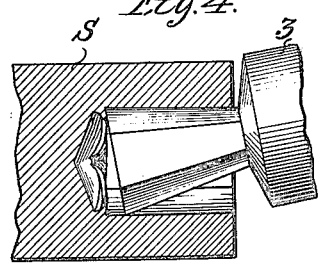
Witnesses.
Inventor.
Henry E. Warren

UNITED STATES PATENT OFFICE.

HENRY ERNEST WARREN, OF LANCASTER, PENNSYLVANIA, ASSIGNOR TO MAC-IT PARTS COMPANY, OF LANCASTER, PENNSYLVANIA, A CORPORATION OF PENNSYLVANIA.

METHOD OF AND APPARATUS FOR GENERATING HOLES IN METAL.

1,123,045.      Specification of Letters Patent.      Patented Dec. 29, 1914.

Application filed August 24, 1914. Serial No. 858,241.

*To all whom it may concern:*

Be it known that I, HENRY ERNEST WARREN, a citizen of the United States, residing at Lancaster, in the county of Lancaster and State of Pennsylvania, have invented certain new and useful Improvements in Methods of and Apparatus for Generating Holes in Metal; and I do hereby declare the following to be a full, clear, and exact description of the invention, such as will enable others skilled in the art to which it appertains, to make and use the same.

The present invention relates to a method of and apparatus for generating holes in metal, and more particularly to a method of and apparatus for generating hexagonal holes in set screws better known as hex-hole set screws.

The object of the invention is to produce a method of and apparatus for generating holes in metal and more particularly for generating hexagonal holes in set screws.

The invention consists in the method and apparatus hereinafter described and particularly defined in the claims.

In the accompanying drawings illustrating more or less diagrammatically an apparatus for carrying out this method, Figure 1 is a plan of the machine; and Figs. 2, 3 and 4 illustrate the action of the tool on the stock.

The stock S is a long bar supported in the hollow lathe spindle 1 of the head stock H of the machine, being held by the chuck C in position for the performance upon it of the operation of making a set screw. It has not been considered necessary to illustrate an automatic screw machine in which this invention is particularly adapted to be used, such machine being well known to those skilled in the art; it will accordingly suffice for the purpose of explaining the method and apparatus, to illustrate a simple form of mechanism as an embodiment of the apparatus forming the subject of this invention.

Preliminary to the operation of generating the hexagonal hole a round hole is bored in the end of the stock. The hole generating tool 2 has a shank 3 which is mounted in the spindle 4 supported in the journal 5 in turn supported upon the slide 6 of the machine. This slide 6 can be moved back and forth in the line of the axis of the head stock of the lathe by means of the handle 10 or the feed screw 11. The tool spindle 4 is arranged at an angle of about 1½ degrees to the axis of the head stock of the lathe, and at its rear end it is connected by means of a universal joint 12 with the tool driving shaft 13. (In the drawing this angle of offset which is varied according to varying conditions is shown greatly exaggerated for the sake of clearness.) The tool spindle is provided with a gear 14 meshing with a gear 15 on the back shaft 16 of the machine; and on the lathe spindle is mounted a gear 17 meshing with the gear 20 on the back shaft 16. The gears 17 and 20 are of the same size and the gears 14 and 15 are of the same size, consequently the tool spindle rotates at the same speed as the lathe spindle. Power may be applied to the lathe spindle by any suitable manner, as by means of a motor or belting. The back shaft 16 is connected by means of the gears 21 and 22 with a nut on the feed screw 11. The lathe spindle and the tool spindle must be rotated at the same speed (when the method requires the rotation of both) and they may be rotated in either direction. It is immaterial in which direction the tools revolve so far as the carrying out of the invention is concerned. In the illustrated embodiment of the invention a truncated regular hexagonal pyramid constitutes the hole generating tool 2 whose cutting edges are formed by the intersection of the larger base with the sides of the pyramid. These cutting edges perform the cutting operation in generating the polygonal hole in the stock. The tool is joined by its smaller base with the tool stock 3. Now, when the stock S and the hole generating tool 2, are rotated at the same speed and the tool is fed gradually either by hand or by power, in the direction of the axis of the stock, the cutting edges of the hole generating tool are forced into the metal of the stock and generate therein a hole which, in the case under consideration, is a regular hexagonal prism. After the operation of forming the hexagonal hole in the end of the stock, if the stock is to be used in the manufacture of set screws the exterior of the stock will be screw-threaded, and then the set screw will be cut off from the stock and the point shaped in any usual manner.

The present invention is broad and generic in character. I believe I am the first to generate holes in metal by the method herein described. Referring to Fig. 2, it will be observed that while the stock S and tool 2 occupy the positions with relation to each other illustrated in the figure, and are rotated, there is no action of the tool upon the material, but when the tool begins to move longitudinally in the direction of the axis of the stock, then the tool begins to penetrate the stock. For example, as the point 30 on the tool 2 moves from the position shown in Fig. 2 to the position indicated in Fig. 3, it will have moved axially a distance in the direction of the axis of the stock equal to the distance between the horizontal projection of the point 30 on the axis of the stock; but inasmuch as the tool and stock are rotating at the same speed, there will be no relative rotary motion between the two, only an endwise or axial motion. This is the cutting motion. When the point 30 travels from its position in Fig. 2 to its position in Fig. 3, the cutting edge 29—30 will have performed its cutting operation. It is then withdrawn from cutting action until point 30 again reaches its position as indicated in Fig. 2. The other cutting edges of the tool are brought into and withdrawn from cutting operation in exactly the same manner. It is apparent, therefore, that the feeding of the hole generating tool into the stock causes progressive cutting or shearing of the stock by the tool.

I am aware that prior to my invention hex-holes have been broached in metal by forcibly thrusting into it a tool moving in the direction of the axis of the hole to be shaped by the broaching operation, but in such operation there was no progressive action of the tool upon the metal except that due to the forcible thrusting of the tool into the metal; whereas in the method of the present invention the cutting operation is a progressive operation which forms the hole in the metal as the material and tool rotate, thus avoiding subjecting the parts of the machine to the great stresses incident to broaching. Moreover the method of the present invention is susceptible of being carried on at a very high rate of speed, so that economy of operation is secured, both by reason of the great speed at which it may be carried on, and by reason of the uniformity of the power consumption during the carrying on of the operation.

The principal use now known for the method and apparatus of this invention is the manufacture of hex-hole set screws, but it is apparent that the invention contemplates, generically, the method of and machine for generating holes which consists in supporting the stock and tool at an angle to each other and in causing the stock and tool to gyrate the one with relation to the other and to move progressively toward each other. For example, regular or irregular polygonal or holes otherwise shaped may be generated by this method and machine, also holes having a portion consisting of a curved surface and portions consisting of prismatic surfaces may be made. The operation of the hole generating tool in forming the hole in the stock being operated upon is a progressive shearing action due to the inclination of the cutting face of the tool to the stock being operated upon by it.

Having thus described the invention, what is claimed is:—

1. The method of generating holes in stock which consists in rotating the stock to be operated upon and the tool operating upon the stock at the same speed with their axes at an angle to each other and intersecting and moving the tool and stock relatively to each other so as to cause the tool to enter the stock to generate a hole in the stock corresponding in form and size to the form and size of the end of the tool, substantially as described.

2. An apparatus for generating holes in stock having, in combination, means for supporting and rotating the stock, means for supporting and rotating a tool for operating on the stock at the same speed of rotation as the stock, the axis of the supporting means for the stock and the axis of rotation of the tool being at an angle to each other and intersecting each other, and means for feeding the tool into the stock, substantially as described.

3. The method of generating holes in stock which consists in removing the greater portion of the material from the space to be bounded by the finished hole, in supporting the tool and stock with relation to each other so that the axis of the proposed hole intersects the face of the cutting tool and in causing the tool to move in a direction parallel to the said axis and in addition to cause successive portions of the edge of the cutting tool to engage corresponding successive portions of the material around the periphery of the hole being formed, substantially as described.

4. The method of generating holes in stock which consists in supporting the stock to be operated upon in suitable position and subjecting it to the operation of a tapered tool supported by its smaller end with its axis at an angle to but intersecting the axis of the hole to be formed in the stock and in causing the stock and tool to gyrate the one with relation to the other and to move progressively toward each other, substantially as described.

5. The method of generating holes in stock which consists in supporting the stock to be operated upon in suitable position and subjecting it to the operation of a tool, the stock having the axis of the hole to be formed therein arranged at an angle to the axis of the cutting portion of the tool, and causing the stock and tool to gyrate the one with relation to the other and to move toward each other during the operation, substantially as described.

HENRY ERNEST WARREN.

Witnesses:
HOMER B. LUTZ,
BERTHA ERK.